US008768847B2

(12) United States Patent
Burger et al.

(10) Patent No.: US 8,768,847 B2
(45) Date of Patent: Jul. 1, 2014

(54) PRIVACY ENHANCING PERSONAL DATA BROKERAGE SERVICE

(75) Inventors: Douglas Christopher Burger, Bellevue, WA (US); Jaron Zepel Lanier, Berkeley, CA (US); Karin Strauss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/530,013

(22) Filed: Jun. 21, 2012

(65) Prior Publication Data

US 2013/0346310 A1 Dec. 26, 2013

(51) Int. Cl.
*G06Q 99/00* (2006.01)
*H04L 29/06* (2006.01)

(52) U.S. Cl.
CPC .......... *H04L 63/101* (2013.01); *G06Q 2220/12* (2013.01)
USPC ....................................................... 705/51

(58) Field of Classification Search
USPC ....................................................... 705/51
See application file for complete search history.

(56) References Cited

U.S. PATENT DOCUMENTS

| | | | |
|---|---|---|---|
| 7,340,438 B2 * | 3/2008 | Nordman et al. | 705/64 |
| 7,684,809 B2 | 3/2010 | Niedermeyer | |
| 7,992,195 B2 * | 8/2011 | Pfitzmann et al. | 726/6 |
| 8,544,084 B2 * | 9/2013 | Owen et al. | 726/19 |
| 2002/0174073 A1 * | 11/2002 | Nordman et al. | 705/64 |
| 2003/0182194 A1 | 9/2003 | Choey et al. | |
| 2005/0213763 A1 * | 9/2005 | Owen et al. | 380/270 |
| 2006/0047847 A1 * | 3/2006 | Saccocio | 709/235 |
| 2007/0130460 A1 * | 6/2007 | Pfitzmann et al. | 713/168 |
| 2008/0227471 A1 | 9/2008 | Dankar et al. | |
| 2009/0132813 A1 | 5/2009 | Schibuk | |
| 2009/0327135 A1 | 12/2009 | Nguyen et al. | |
| 2010/0186066 A1 * | 7/2010 | Pollard | 726/3 |
| 2010/0271263 A1 | 10/2010 | Moshfeghi | |
| 2011/0047075 A1 | 2/2011 | Fourez | |
| 2011/0302273 A1 * | 12/2011 | Pfitzmann et al. | 709/217 |
| 2012/0144196 A1 * | 6/2012 | Owen et al. | 713/168 |

OTHER PUBLICATIONS

"Mobile Phones to Be Used in Fraud War", Retrieved on: Oct. 10, 2011, Available at: http://www.transactionage.com/2011/03/01/mobile-phones-to-be-used-in-fraud-war/.

\* cited by examiner

*Primary Examiner* — James D Nigh
(74) *Attorney, Agent, or Firm* — Dan Choi; Carole Boelitz; Micky Minhas

(57) ABSTRACT

The subject disclosure is directed towards a technology by which access to a protected entity's data is controlled by a data brokerage service. The service determines whether a requesting entity has appropriate access rights to requested information, and if so, the service returns a response corresponding to the protected data. In one aspect, the protected data may be location data of a protected entity that is maintained independent of a payment instrument. The location data is used to compute feasibility information as to whether the protected entity is authorized to perform a transaction using the payment instrument.

20 Claims, 6 Drawing Sheets

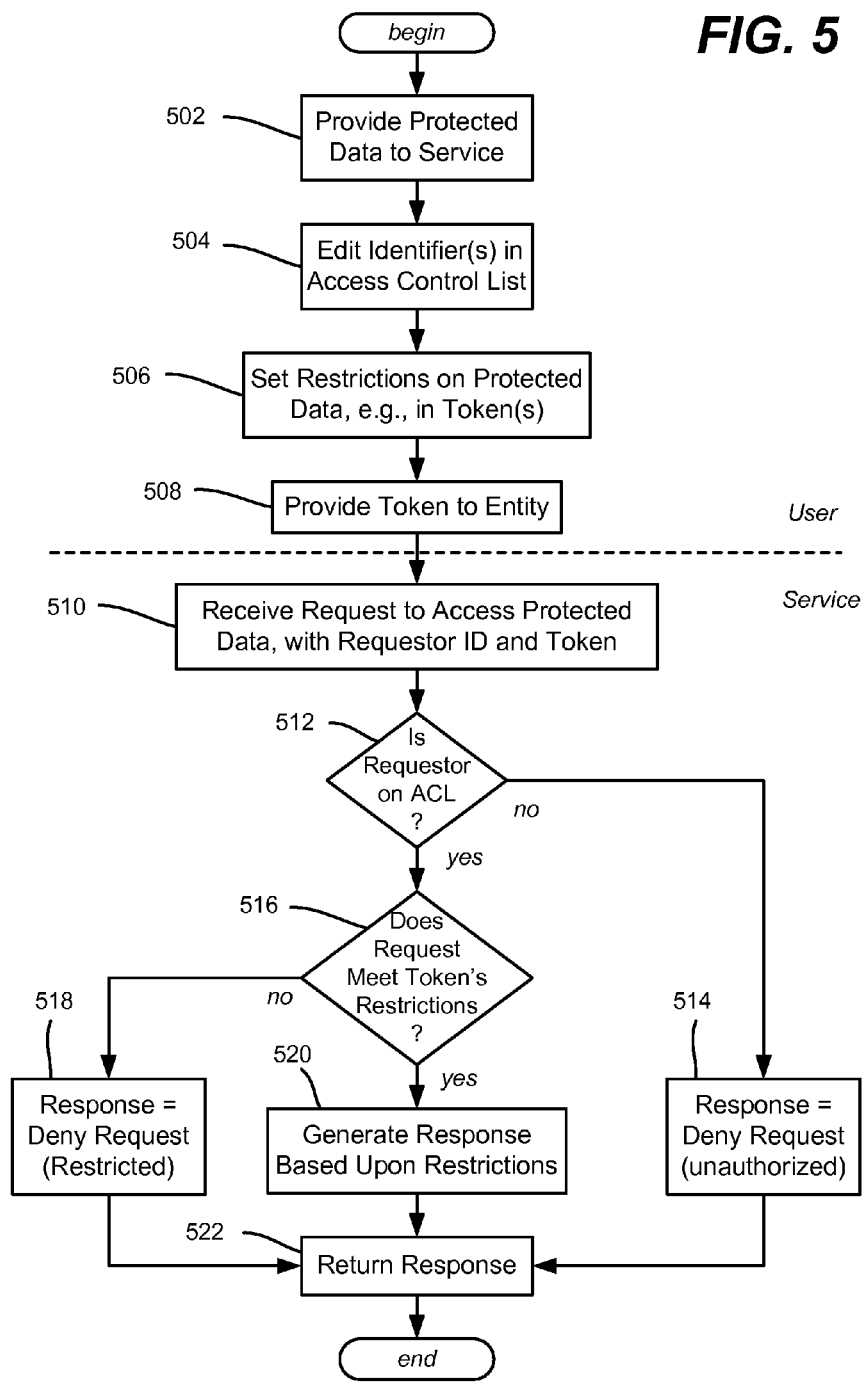

PRIVACY ENHANCING PERSONAL DATA BROKERAGE SERVICE

BACKGROUND

There are many situations in which knowing additional information about a person (or another entity such as a corporation) adds value to a scenario. For example, salary data and a credit score may be needed to determine whether a person is allowed to rent an apartment.

Current location is another piece of additional information that may add value to a scenario. For example, in online and presential (in-person) purchases made with an electronic payment instrument, no cross-check is done on the location of the card owner at the time of the purchase. If an attacker steals the owner's credit card and billing information, there is little evidence to check that the person using the credit card is a legitimate user, particularly in online purchases. Even in presential transactions, checking identifiers (IDs) can be error prone and is not usually done.

However, any time a user provides such additional information, privacy may be lost. In the above example of needing salary/credit score information, a person has to give the information (which may be authorization to get the information) to the landlord/rental company to get approval. Providing location information (other than the location at the time of a presential purchase, which is known) gives the legitimate purchaser an extra layer of protection, but also compromises privacy to an extent. Giving less information yet still getting a desired result in such situations is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which access to a protected entity's data is controlled by a data brokerage service. The data brokerage service maintains secured data of a protected entity in association with access rights to subsets of the secured data. When the data brokerage service configured to receive a request corresponding to a requested subset of the secured data from a requesting entity, the service determines whether the requesting entity has appropriate access rights to information in the requested subset. If so, the service returns a response corresponding to the secured data in the requested subset to the requesting entity, which may be actual data, or a result of some computation over the data.

In one aspect, there is described maintaining location data of a protected entity independent of a payment instrument. The location data is used to compute feasibility information as to whether the protected entity is authorized to perform a transaction using the payment instrument.

In one aspect, a service receives an access request from a requesting entity to access protected data. The service determines whether the requesting entity has access rights, and whether the request meets one or more restrictions associated with the protected data. If the requesting entity has access rights and the request meets the restrictions, the service returns a response to the requesting entity that corresponds to at least part of the protected data, (which may be actual data, or a result of some computation over the data), or otherwise denies the request.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a flow diagram showing example steps that may be taken to implement and operate a data brokerage service according to one example implementation.

DETAILED DESCRIPTION

Various aspects of the technology described herein are generally directed towards a data brokerage service that maintains or has access to some set of information regarding a protected entity. When the protected entity needs to release some of the information to a requesting entity, the requesting entity is only able to obtain resulting data (e.g., as part of a response) based upon a relevant subset of that information. A third party verifying entity may be used to verify that the resulting data is true.

In one example scenario, the information regarding a person may be the current (or relatively recent) location of that person, based upon a device owned by that person and equipped with location tracking mechanism, such as a GPS system. In a commercial transaction scenario, the data brokerage service may be used by a vendor and payment company (e.g., credit card company) to obtain evidence that the protected entity is likely located at the physical point-of-sale during a presential transaction, or for online purchases is at a particular location that is protected in some way, e.g., the user is using his or her own computing device as known by its location. However, while a confirmation of the location is made, the actual location of the user need not be released to the merchant and/or payment company for an online transaction. Further, for a presential transaction, the user's location data of any prior locations is protected from the merchant and/or payment company.

It should be understood that any of the examples herein are non-limiting. For example, while commerce is used in most example scenarios, other non-limiting example scenarios include those related to reputation, location, medical, financial, and/or insurance. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, security and privacy in general.

Figure 1:
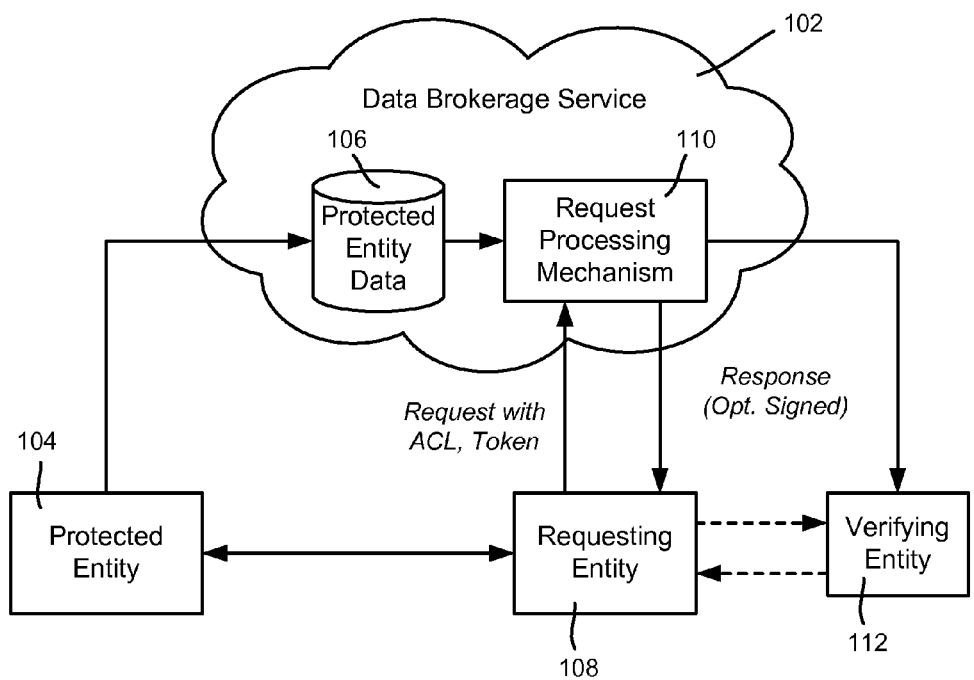
FIG. 1 is a block diagram representing example components/participants of a data brokerage service used to control access to protected data according to one example implementation.

FIG. 1 is a block diagram showing a system including a data brokerage service 102 as described herein in one example implementation. In general, a protected entity 104 (which may be a person, a device, a third party that provides services to a person such as related to a utility bill) provides some set of data 106 to the data brokerage service 102. Example data 106 may include actual information such as current location coordinates or the like (e.g., city, state and/or zip), and/or authorization to obtain the information from an appropriate source, such as a credit score company when needed and appropriate. For purposes of brevity, the data 106 as well as the information may be referred to herein as simply the "data" or the "information" regardless of whether it is the actual data, a pointer to it, the authorization to obtain it from another source, as well as any accompanying metadata.

At some time, the protected entity 104 deals with a requesting entity 108 that needs some amount of the data 106, such as to participate in a transaction, obtain information (e.g., college transcripts) as a job interviewer, or the like. Along with the information itself, the user may provide metadata and the like that accompanies the data 106 and controls the release of the information so that only a subset of the information is released, which includes a response computed from the information such as yes or no.

More particularly, the user may set up the data brokerage service with metadata or the like so that a request processing mechanism 110 that accesses and processes the data 106 only releases a yes/no (or not known) answer or other limited answer to a particular requesting entity. An access control list (ACL) or the like may be used to limit which entities are allowed to request information, and a token (which may be may generated by the ACL) may be used to obtain the information. The token may be a single use or multiple use token, and specify limitations such as a frequency of access restriction, duration of access restriction, number of accesses restriction, type of data (e.g., what subset of data is accessible) restriction, and a fidelity of the data restriction (e.g., whether actual data or only yes/no/not known is returned). Note that the ACL and token may be used in combination to prevent situations in which the token is obtained by an unauthorized entity.

The processing done at the arrival of the request may be determined by a code provider that provides code for accessing the data. This code may be the personal data brokerage service provider itself, the entity that will later send requests that invoke that processing, and/or a third party or the like. The user may have to authorize this code provider to participate in the personal data brokerage service (e.g., the user may have to install the code and authorize the code to access a subset of data used as input). Note that the code provider may or may not have an incentive to honor a contract that determines what data may be sent as a response to a request. Thus, a verifying entity may be used in conjunction with a digital signature (e.g., a signed response) or the like to verify that the code abides to the contract. Alternatively, known techniques such as static and dynamic dataflow code analysis, programming languages that by design prevent this, or the like may be used to determine whether and/or enforce that the code abides to the contract.

By way of example, when a particular sub-service such as fraud detection is setup (e.g., when a credit card company first issues a credit card), the provider makes available to the user executable location tracking/validation code. The user installs this code with the personal data brokerage service and allows the code to access a subset of the data. When a corresponding request comes in, this code gets invoked to service the request. To ensure that the code is not secretly/improperly accessing any of the user's unauthorized data, the code may be written in a language that does not allow doing so, known static or dynamic dataflow code analysis may be applied, the code could be verified by a certification agency, and/or the like.

The answer may be allowed to be made only once or some limited number of times, only for a certain time window, only so often, and so forth. For example, a user may allow a specified landlord up to one week to obtain, and only one time, only a yes/no answer as to whether the user's credit score exceeds a minimum that the landlord identifies, and only a yes/no answer as to whether the user's salary exceeds a minimum salary. Thus, in this example the landlord as a requesting entity 108 obtains the information that is needed for rental approval, but the protected entity 104 does not divulge actual numbers, nor allow this information to be deduced as the metadata is set to prevent multiple queries that otherwise may be used to hone in on the actual numbers.

Note that the protected entity 104 may or may not have an incentive to provide false data. For example, for a credit card purchase, the protected entity 104 generally wants to provide true current location data so that a fraudulent purchase is more difficult for someone else to make. Conversely, some dishonest people or entities may want to "inflate" their protected data, such as to have a higher credit score than its actual number, provide false transcripts, have a higher business reputation score, and so forth. Even if the data brokerage service 102 is honest, the protected entity data 106 given by the protected entity 104 may not be trustworthy in many situations. Thus, a verifying entity 112 may be used in conjunction with a digital signature (e.g., a signed response) or the like to verify that any data that is returned by the service 102 is correct.

By way of example scenarios, information that may be released in a controlled manner may include reputation data, location data, medical data, financial data, insurance data, and preference data to an approved advertiser. A user or company may authorize a requesting entity to obtain reputation-related data, such as business credentials, college transcripts, bill paying history, and so forth.

In medical scenarios, a user may allow a pharmacy to cross-check a prescription against a list of known allergies and other medications that the user (or a doctor on the user's behalf) has supplied to the data brokerage service. So that a pharmacy worker cannot deduce the full list, the pharmacy may be limited to a yes/no answer as to a given medication, in how often it may ask, and so forth. A hospital may be given access to the full list of allergies and medications so that in an emergency situation, a doctor has valuable knowledge. This may be combined with location information, e.g., if a hospital in a distant country is requesting the information and the user is not possibly at that location, the request may be denied or otherwise acted upon. A user may voluntarily release his information to a pre-approved scientific research entity, but may specify to the data brokerage service that the user's identity cannot be revealed, or deduced by not allowing the release unless the data is mixed with the data of some sufficient number of other individuals.

In financial scenarios, information about credit scores, loans, debt load, salary, whether an investor is an accredited investor with a certain net worth, and so forth all may be released. As before, the information may be limited to a yes/no answer based upon a certain financial subset of the user's information, or may be data from the subset itself. For example, a loan company may check whether a user's debt-to-income ratio is below a certain percentage, without actually obtaining the percentage.

Insurance-related scenarios provide other uses. For example, a user may be offered a car insurance discount if the car's whereabouts, as known via the car's location information, generally is in an area with a low occurrence of car theft. Whether the user speeds or meets some other related metric (as obtained by verified GPS data in conjunction with the times the user is driving as computed from other device sensors) may be another question when a user is requesting a quote or being considered for a discount.

Advertising is yet another scenario, in which a user may authorize a certain company to target advertising based upon user preferences maintained in the service. Some users like targeted advertising, and thus for example a user who likes traveling may get travel deals advertised according to their preferences without having to separately register with each desired travel company to get them.

Another scenario is directed toward maintaining a confidential model of a user such as a voice model or handwriting recognition model trained by and/or learned from the user. The data brokerage service stores, maintains and keeps the user's voice model and/or handwriting model confidential, while still providing the service of transcribing the user's verbal exchanges and/or recognizing handwriting, without the need to share any model. Other personalized models that authorized third parties desire to use, in which the raw user data is considered sensitive but the output of the model is not, may similarly use the data brokerage service.

Turning to commercial transaction scenarios in which location may be used as additional evidence as to whether a transaction is more likely legitimate or fraudulent, in one implementation, the location data may be periodically uploaded, along with a timestamp, to a cloud service, which builds a model of where the user is located and its progression (which assumes the user carries the device, e.g., a smartphone). When the user attempts to use a payment instrument (e.g., a credit card) for a purchase, a purchase authorization request may be sent to the user's device by the merchant (for example, by email, Bluetooth® connection, near field communication, or other communication mechanism). The device, in turn, sends the purchase record, along with an attested encrypted location to the payment company (e.g., bank). Optionally, the device also sends an access-granting cryptographic token to the payment company. The payment company then obtains access to the data brokerage service (e.g., in the form of a location feasibility verification service) via the cryptographic token sent by the user's device with the purchase record or other access control method such as an access control list configured by the user, and invokes the location feasibility verification service. The location feasibility verification service decrypts the attested location sent with the purchase record and verifies its feasibility, such as, for example, by verifying that the attested location is physically possible given the user's recent location track, verifying that the attested location is consistent with locations that the user normally visits, and/or verifying that the attested location is consistent with a location the user is expected to visit according to his/her calendar (note that calendar data may likewise be kept confidential by the data brokerage service yet still be used for providing a result). The location feasibility verification service may return a confidence score or other information indicating that the purchase is likely authentic or not. The payment service then uses this information, along with any other fraud detection techniques, to decide whether to authorize the purchase.

Figure 2:
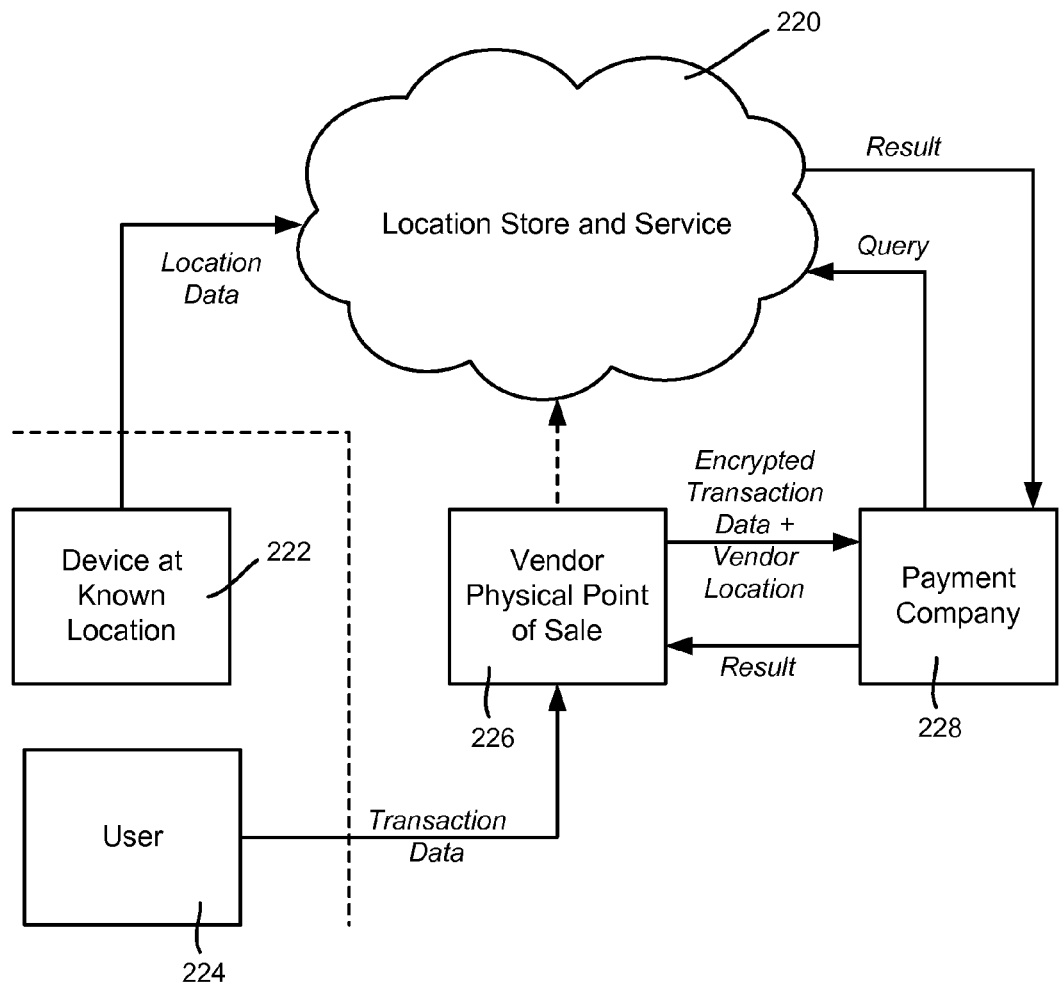
FIGS. 2 and 3 are block diagrams representing example components/participants of a remote data brokerage service that uses location data as part of a commercial transaction according to example implementations.

FIG. 2 shows an example data brokerage service implementation in the form of a location store and service 220 that obtains location data from a user's device 222. When a user 224 makes a purchase at a vendor 226 (at the physical point of sale), the user provides transaction data such as by presenting the physical credit card, debit card or the like. This information is transmitted securely to the payment company 228 for verification. As part of the verification process, the payment company makes a number of checks (e.g., is the card valid, does the purchase cause the limit to be exceeded and so forth).

As described herein, an additional check that the payment company 228 is able to make is whether the reported device location data matches the vendor location and/or if the location is consistent with previous locations, which may be a simple yes/no answer. If there is a location match, (which may involve the device providing a token and/or other data to the payment company 328 as described above), this provides additional evidence that the purchase is legitimate. If not, then perhaps the purchase is fraudulent, although it is also possible that the user 224 does not have the device 222 with him or her at the time. How the payment company 228 uses this additional information is up to its agreement with the user and/or vendor, e.g., do not allow purchases over $500.00 without a location match, require the vendor to check a driver's license or other ID as well as perform a visual signature comparison for purchases between $10.00 and $500.00, and so on.

It is also feasible for the location store and service 220 to maintain user location history data and thereby report something other than a yes/no answer to the payment company. For example, even if the location matches, the answer may be a numerical confidence answer or flagged with additional information that based on history the answer corresponds to a strong yes, a regular yes, or a weaker yes. If the user does not have the device with him or her, the service 220 may return a confidence score based upon history and the last known device location, although the user may have to grant the payment company access without a dynamically per-transaction generated token in such a situation.

Note that in this example, the vendor location is known to the payment company, and thus the user location need not be protected from the payment company 228; (note that the user location data may be sent securely to the location store and service 220 to thwart its unauthorized use by interception or the like). Indeed, any of the transmissions between any of the entities are typically encrypted and signed, such as using well-known public key/private key technologies, so that communications are secure from unauthorized listeners. Although knowing the location of a physical purchase is the current situation today, the user is additionally protected by the location check; the user may be incentivized to participate in the extra level of security provided by location checking, such as by giving a lower interest rate to such users.

Notwithstanding, as represented by the dashed line from the vendor 226 to the location store and service 220, it is also feasible for the vendor 226 to report its location to the location store and service 220 (which may be in an encrypted manner) rather than to the payment company 228. The location store and service 220 thus need only report a yes/no answer or confidence score as to whether the location is matched, for example. This allows a mobile vendor such as a limousine or taxicab service with wireless communication to not reveal its current location to the payment company 228, so that the payment company 228 is not allowed to track the movements of the user 224 via a mobile vendor's location.

Figure 3:
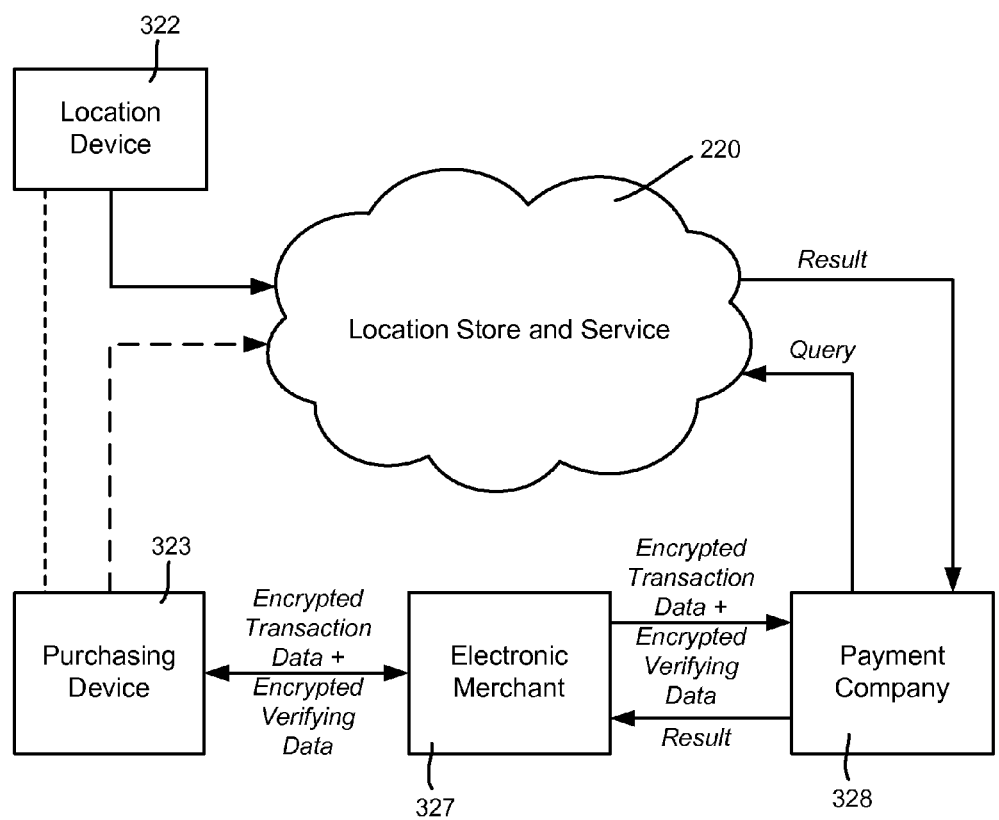

FIG. 3 shows the location store and service 220 that obtains location data from a user's device 322. The device 322 may be the same as the purchasing device 323 used to make the purchase, but need not be. Thus, for example, the user may use one device such as a cell phone to report the user's location, and a different device such as a personal computer to make a purchase; the IP address and/or GPS data or the like associated with the purchasing device 323 versus the user's location as reported by the location device 322 may be used to match locations.

Note that instead of or in addition to location data, the purchasing device 323 may be a mostly stationary device such as a user's personal computer that the user registers with the service 220 (e.g., the dashed arrow in FIG. 3). For example, when the user makes a purchase via the registered purchasing device 323, a device identifier may be used as evidence that the purchase is legitimate.

Returning to location considerations, when the device 323 is used to make a purchase at an electronic merchant 327, the user provides transaction data such as the numbers of the credit card or debit card, and possibly other data (name, address, telephone number and the like). Because the additional verification information is further encrypted, the transaction is made without revealing the purchaser's location to the electronic merchant 327 or the payment company 328. However, the payment company 328 is able to obtain additional evidence as to the purchase being legitimate or fraudulent. A purchase is more likely fraudulent if the purchase is being attempted via a purchasing device 323 at a non-matching location (or a different, non-registered device).

Figure 4A:
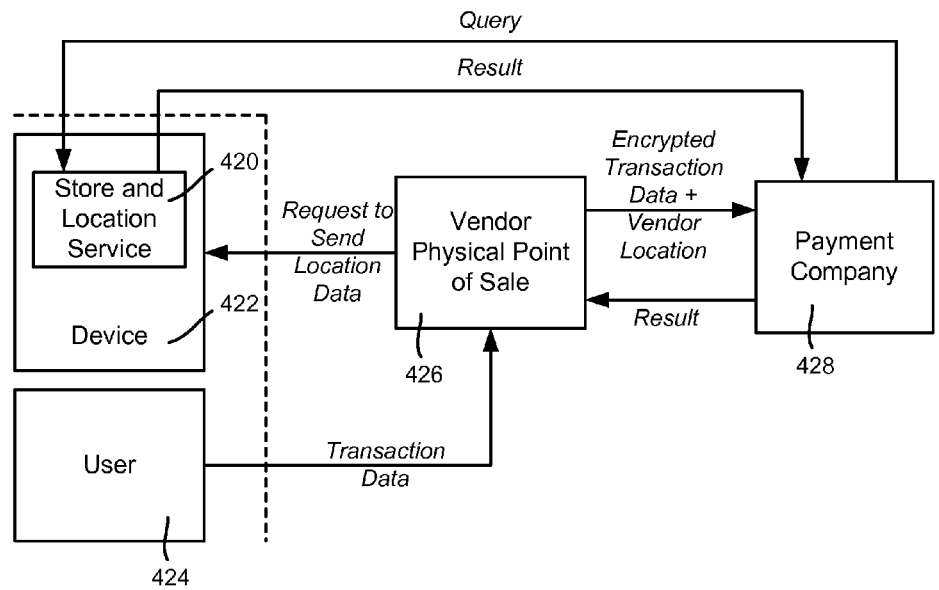
FIGS. 4A and 4B are block diagrams representing example components/participants of a device-local data brokerage service that uses location data as part of a commercial transaction according to example implementations.
Figure 4B:
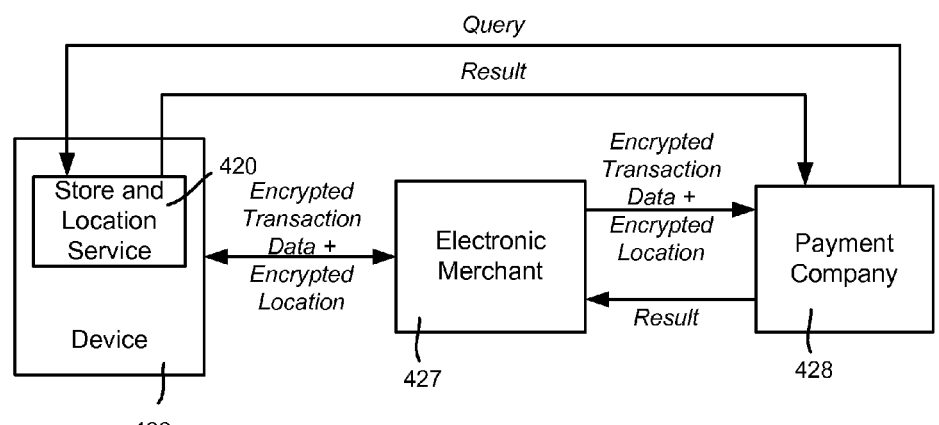

FIGS. 4A and 4B comprise representations of systems similar to FIGS. 2 and 3, respectively, except that the location service 420 is built into the device 422. In general, what was represented as running in the cloud in FIGS. 2 and 3 may run in the user's desktop or other user device that is (reasonably) always connected. In these examples, the user 424 has agreed to provide location (and/or device) information to the payment company 428, e.g., encrypted with the user's private key. A token also may be sent. So that the location data need not be provided except at the time of purchase as part of a transaction, the payment company 428 may query the store and location service 420 of the device 422 (and/or electronic merchant 427) and obtain a result containing the user's data including location information. The payment company 428 may query for this data in order to authorize the transaction.

FIG. 5 is a flow diagram showing example steps in one example implementation, beginning at step 502 where the user (or other entity such as a device or third party) adds information to the data brokerage service. Step 504 represents the user editing (e.g., initially adding) identifiers (e.g., credentials) of requesting entities that are allowed to access some of the data (which may be the full set) or some smaller subset thereof. Step 506 represents the user adding restrictions on access to the protected data, e.g., which are used to generate tokens and process received tokens. For example, a user may give a credit card company only the right to access the location sub-service of a larger data brokerage service, while restricting a pharmacy only to asking a yes/no question regarding whether a user has a known allergy to a pharmacy-specified medicine. A user may allow his or her doctor to see a full list of allergies, and possibly give the doctor access rights to update that list.

Note that the user may repeat steps 502, 504 and/or 506 at any time. This allows adding new data, editing the access control list, and changing restrictions as desired.

Step 508 represents providing a token to an entity. The user may or may not provide a token to an entity in advance of some need for it, or may wait until the token is needed; further the user may automatically instruct the service to email or otherwise send a token to an entity at a future time. Thus, step 508 may be a dynamic operation at the time of need, and/or may be automated at least in part.

Steps 510 and above (as well as possibly step 508) represent operations performed by the service once the user has provided some information via steps 502, 504 and/or 506. Step 510 represents receiving a request for some amount of the protected data, which typically needs to be accompanied by credentials that identify the requesting entity and a token.

Step 512 evaluates whether the credentials are valid with respect to the access control list. If not, step 512 branches to step 514 where a denied response is generated for sending to the requesting entity (at step 522). Note that it is feasible to ignore such a request without a response, however doing so (at least once) and indicating that the requesting entity was unauthorized allows a requesting entity to contact the user and let the user know that the ACL needs to be updated, for example.

If the requesting entity is valid, step 516 evaluates whether the request meets the token's restrictions. Any restrictions may be specified including those set forth above, including whether the token has expired in time or usage, whether the request is too soon after a previous one, whether the request is for higher fidelity than the token allows (e.g., a list is requested but the token only allows a yes/no answer), whether the request seeks the correct subset of data (e.g., medical versus financial credit information) and so on. If not met, step 516 branches to step 518 where a denied response is generated. Depending on data in the token or elsewhere, the response may be controlled as well, such as to prevent unauthorized probing, but possibly to provide information explaining that the information is restricted (e.g., the pharmacist asked for a list of medicine allergies but is only allowed to identify a medication and get a yes/no/not known answer).

Note that anytime a token is processed at step 516, information associated with the token may be updated, e.g., a usage count may be decremented. It is also feasible to update such information even if the token is not processed, e.g., a token received from an unauthorized requestor may be expired. Whether or not a token that is received is considered used or not when a request comes in that is denied because the request did not comply with a restriction in the token may be policy specified in the token or maintained elsewhere, e.g., a pharmacist who asks for a list instead of a yes/no answer may be allowed to reuse the token to try again without needing to have a new one generated.

If the request meets the token's restrictions, step 520 generates the appropriate response corresponding to the protected data, e.g., a list, a yes/no/not known answer, a probability or other confidence score, and so on. Step 522 represents sending whichever one of the responses that was generated at step 514, step 518 or step 520.

Example Computing Environment

Figure 6:
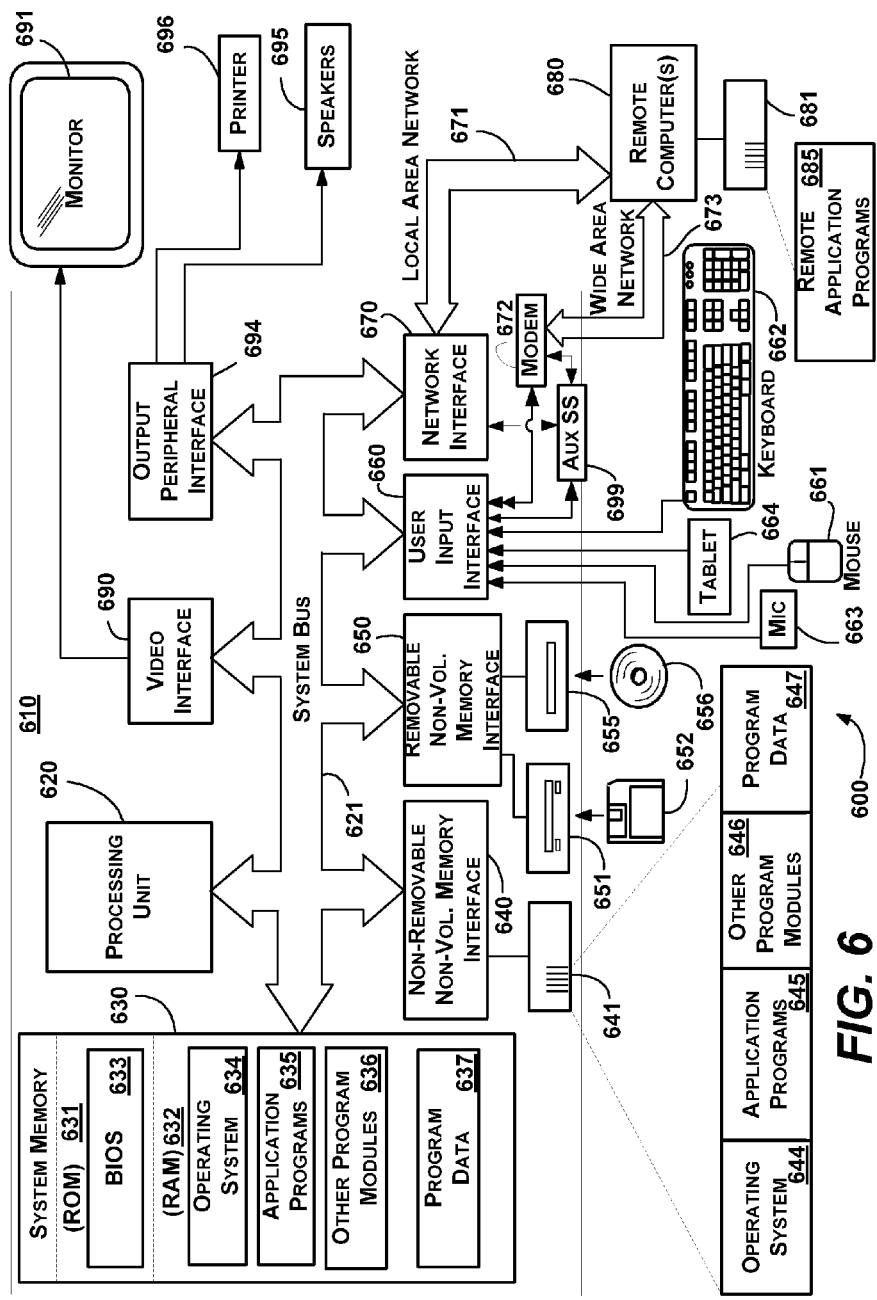
FIG. 6 is a block diagram representing an example non-limiting computing system or operating environment, into which one or more aspects of various embodiments described herein may be implemented.

FIG. 6 illustrates an example of a suitable computing and networking environment 600 into which the examples and implementations of any of FIGS. 1-6 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising, at least one processor, a memory communicatively coupled to the at least one processor and including components comprising, a data brokerage service, the data brokerage service configured to maintain secured data of a protected entity in association with access rights to subsets of the secured data, the data brokerage service configured to receive a request corresponding to a requested subset of the secured data from a requesting entity, and based upon a determination as to whether the requesting entity has appropriate access rights to information in the requested subset, to execute code provided by an authorized code provider to access the requested subset in which the code abides to a contract that determines what data is sent to the requesting entity, to verify the information in the requested subset, and to return a response corresponding to the secured data in the requested subset, including actual data or computed data, or both, to the requesting entity.

2. The system of claim 1 wherein the data brokerage service is further configured to process a token to determine whether the request complies with a frequency of access restriction, a duration of access restriction, a number of accesses restriction, a data type restriction, or a fidelity of data restriction, or any combination of a frequency of access restriction, a duration of access restriction, a number of accesses restriction, a data type restriction, or a fidelity of data restriction.

3. The system of claim 1 wherein the data brokerage service is further configured to process an access control list and a token to determine whether the requesting entity has appropriate access rights to information in the requested subset.

4. The system of claim 1 wherein the data brokerage service is coupled to a verifying entity that provides a signature for use in verifying the response.

5. The system of claim 1 wherein the data brokerage service is further configured to verify that the code abides to the contract.

6. The system of claim 1 wherein the secured data of the entity comprises location data.

7. The system of claim 1 wherein the secured data of the entity comprises reputation data or medical data, or both reputation data and medical data.

8. The system of claim 1 wherein the secured data of the entity comprises financial data or insurance-related data, or both financial data and insurance-related data.

9. The system of claim 1 wherein the secured data of the entity comprises personalized model data, or calendar data, or both personalized model data and calendar data.

10. One or more computer-readable storage devices having computer-executable instructions, which when executed perform steps, comprising:
    receiving an access request from a requesting entity to access protected data;
    determining whether the requesting entity has access rights;
    determining whether the request meets one or more restrictions associated with the protected data;
    determining whether code provided by a code provider abides to a contract that determines what data is sent in response to the access request; and
    based upon the determining steps, returning an answer to the requesting entity that corresponds to at least part of the protected data, including actual data or computed data, or both, otherwise denying the request.

11. The one or more computer-readable storage devices of claim 10 wherein determining whether the requesting entity has access rights comprises processing credentials of the requesting entity against an access control list.

12. The one or more computer-readable storage devices of claim 10 wherein whether the request meets one or more restrictions associated with the protected data comprises processing a token associated with the request that specifies the one or more restrictions.

13. The one or more computer-readable storage devices of claim 10 having further computer-executable instructions comprising, updating information associated with the token based upon usage of the token.

14. In a computing environment, a method performed on at least one processor, comprising, using the at least one processor to maintain secured data of a protected entity in association with access rights to subsets of the secured data, including receiving a request corresponding to a requested subset of the secured data from a requesting entity, determining whether the requesting entity has appropriate access rights to information in the requested subset, and based upon whether the requesting entity has appropriate access rights, verifying code provided by a code provider for accessing the requested subset and executing the code to return a response corresponding to the secured data in the requested subset, including actual data or computed data, or both, to the requesting entity.

15. The method of claim 14 further comprising determining whether the code abides by a contract that determines what data is sent to the requesting entity.

16. The method of claim 14, wherein verifying the code provided by the code provider further comprises verifying the code using a digital signature.

17. The method of claim 14, wherein verifying the code provided by the code provider further comprises verifying the code using at least one of a static code analysis or a dynamic code analysis.

18. The method of claim 14, wherein executing the code further comprising executing location tracking/validation code for a fraud detection sub-service.

19. The method of claim 14 further comprising maintaining location data of the protected entity independent of a payment instrument, and using the location data to compute feasibility information as to whether the protected entity is authorized to perform a pending transaction using the payment instrument.

20. The method of claim 19 wherein using the location data to compute feasibility information comprises verifying that the attested location is consistent with a location the entity is expected to visit based upon calendar data or task data, or both calendar data and task data.

* * * * *